US009856368B2

(12) United States Patent
Herzog et al.

(10) Patent No.: US 9,856,368 B2
(45) Date of Patent: Jan. 2, 2018

(54) SULFUR-CROSSLINKABLE RUBBER MIXTURE

(71) Applicant: Continental Reifen Deutschland GmbH, Hannover (DE)

(72) Inventors: Katharina Herzog, Harsum (DE); Carla Recker, Hannover (DE); Viktoria Pavon Sierra, Hannover (DE); Norbert Kendziorra, Garbsen (DE); Thomas Kramer, Herford (DE); Thorsten Torbruegge, Langenhagen (DE); Norbert Mueller, Nienhagen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 15/073,211

(22) Filed: Mar. 17, 2016

(65) Prior Publication Data

US 2016/0194485 A1    Jul. 7, 2016

Related U.S. Application Data

(63) Continuation of application No. PCT/EP2014/068786, filed on Sep. 4, 2014.

(30) Foreign Application Priority Data

Sep. 27, 2013  (EP) .................... 13186373

(51) Int. Cl.
| | |
|---|---|
| *C08L 9/06* | (2006.01) |
| *C08K 3/36* | (2006.01) |
| *C08L 9/00* | (2006.01) |
| *B60C 1/00* | (2006.01) |
| *B60C 11/00* | (2006.01) |
| *B60C 13/00* | (2006.01) |
| *B29B 7/74* | (2006.01) |

(52) U.S. Cl.
CPC .............. *C08L 9/06* (2013.01); *B29B 7/7495* (2013.01); *B60C 1/0016* (2013.01); *B60C 1/0025* (2013.01); *B60C 11/0008* (2013.01); *B60C 13/00* (2013.01); *C08K 3/36* (2013.01); *C08L 9/00* (2013.01); *Y02T 10/862* (2013.01)

(58) Field of Classification Search
CPC .............. C08L 9/00; C08L 9/06; C08K 3/36
See application file for complete search history.

(56) References Cited

U.S. PATENT DOCUMENTS

| | | | |
|---|---|---|---|
| 5,901,766 A | 5/1999 | Sandstrom et al. | |
| 6,127,472 A * | 10/2000 | Kobayashi | C08K 3/04 |
| | | | 524/492 |
| 6,812,288 B2 | 11/2004 | Kobayashi et al. | |
| 7,241,842 B2 | 7/2007 | Nakamura et al. | |
| 7,968,633 B2 | 6/2011 | York et al. | |
| 7,968,634 B2 | 6/2011 | York et al. | |
| 7,968,635 B2 | 6/2011 | York et al. | |
| 7,968,636 B2 | 6/2011 | York et al. | |
| 8,426,512 B2 | 4/2013 | Zhang et al. | |
| 8,450,424 B2 | 5/2013 | Koelle et al. | |
| 8,459,319 B2 | 6/2013 | Ryba et al. | |
| 2005/0272852 A1 | 12/2005 | Sandstrom et al. | |
| 2008/0223494 A1 | 9/2008 | Amino et al. | |
| 2012/0289647 A1 * | 11/2012 | Koelle | B60C 1/0016 |
| | | | 524/525 |
| 2013/0059965 A1 | 3/2013 | Hirose | |
| 2013/0109800 A1 | 5/2013 | Weber | |
| 2013/0158185 A1 | 6/2013 | Thompson | |

FOREIGN PATENT DOCUMENTS

| | | |
|---|---|---|
| DE | 40 01 822 A1 | 8/1990 |
| DE | 10 2007 060 859 A1 | 6/2009 |
| EP | 0 659 821 A1 | 6/1995 |
| EP | 1 253 170 A1 | 10/2002 |
| EP | 1 963 110 A2 | 9/2008 |
| EP | 2 113 531 A2 | 11/2009 |
| EP | 2 345 696 A1 | 7/2011 |
| JP | 7-238187 A | 9/1995 |
| WO | 99/09036 A1 | 2/1999 |
| WO | 2009/007167 A1 | 1/2009 |
| WO | 2010/059402 A1 | 5/2010 |
| WO | WO 2011101056 A1 * | 8/2011 ........... B60C 1/0016 |

OTHER PUBLICATIONS

Hofmann, W. et al, "Handbuch der Kautschuk-Technologie", pp. 15 to 19, 2001 Dr. Gupta Verlag, Ratingen, Germany.
International Search Report dated Oct. 8, 2014 of international application PCT/EP2014/068786.
U.S. Appl. No. 15/074,672, filed Mar. 18, 2016, Katharina Herzog et al.

* cited by examiner

*Primary Examiner* — Wenwen Cai
(74) *Attorney, Agent, or Firm* — Walter Ottesen, P.A.

(57) ABSTRACT

A sulfur-crosslinkable rubber mixture, in particular for pneumatic vehicle tires, straps, belts, and hoses, is disclosed which exhibits, among other things, improved rolling resistance behavior. The rubber mixture contains at least the following constituents: 5 to 95 phr of at least one styrene-butadiene rubber, which is functionalized with phthalocyanine groups and/or hydroxy groups and/or epoxy groups and/or silane-sulfide groups and the styrene content of which is 0 to 12 wt % and which has a glass transition temperature ($T_g$) according to DSC of −75 to −120° C. in the unvulcanized state, 5 to 95 phr of at least one further rubber, and 20 to 300 phr of at least one silica.

16 Claims, No Drawings

SULFUR-CROSSLINKABLE RUBBER MIXTURE

CROSS REFERENCE TO RELATED APPLICATIONS

This application is a continuation application of international patent application PCT/EP2014/068786, filed Sep. 4, 2014, designating the United States and claiming priority from European application 13186373.0, filed Sep. 27, 2013, and the entire content of both applications is incorporated herein by reference.

FIELD OF THE INVENTION

The invention relates to a sulfur-crosslinkable rubber mixture, in particular for vehicle tires, straps, belts, and hoses.

BACKGROUND OF THE INVENTION

The rubber composition of the tread determines the road properties of a tire, in particular a pneumatic vehicle tire, to a large extent. The rubber mixtures used mainly in the heavily mechanically stressed areas of belts, hoses, and straps are also largely responsible for the stability and durability of these rubber articles. For this reason, the standards for these rubber mixtures for pneumatic vehicle tires, straps, belts, and hoses are very high.

By means of partial or complete replacement of the filler carbon black by silica in rubber mixtures, the road properties of tires, for example, have been improved overall to a higher level in recent years. However, the known conflicting objectives of tire properties with respect to one another continue to be present in silica-containing tread mixtures as well. Thus, an improvement in wet grip and dry braking generally continues to cause deterioration of rolling resistance, winter properties, and wear behavior. These properties are important criteria for quality in technical rubber articles such as straps, belts, and hoses as well.

In vehicle tires in particular, a wide variety of attempts have been made to positively influence the properties of tires by varying polymer components, fillers, and other aggregates, particularly in the tread mixture. The focus here is primarily on the properties of rolling resistance and wear. It must here be borne in mind that an improvement in one tire property often causes worsening of another property.

In a given mixing system, for example, there are various known possibilities for optimizing rolling resistance. These include reducing the degree of filling, changing the polymer system, and reducing the glass transition temperature $T_g$ of the rubber mixture. All of the aforementioned measures result in a decline in the wear properties and/or wet grip properties and/or tear properties of the mixture in question.

In the present document, the term vehicle tires is understood to refer to pneumatic vehicle tires, solid rubber tires, and two-wheel vehicle tires.

In particular, affecting the glass transition temperature of the rubber mixture used by selecting suitable polymer systems is frequently discussed in expert circles.

In this connection, it is known that the glass transition temperature of otherwise identical mixture components of two rubber mixtures is determined by the glass transition temperature of the polymer(s) used. The higher the glass transition temperature of a polymer, the higher the glass transition temperature of the rubber mixture as well, and the less favorable the rolling resistance behavior of the rubber mixture. Good indicators for the rolling resistance behavior of rubber mixtures are rebound elasticity at 60 to 70° C. and hysteresis loss values, expressed by tan δ at 60 to 70° C.

It is generally known that 1,4-polybutadiene rubber has an extremely low glass transition temperature of approximately −105° C., which makes this rubber suitable for improving the rolling resistance behavior of rubber mixtures. However, it is also known that this considerably impairs the wet grip behavior of the rubber mixture.

Another known method of influencing tire properties such as wear, wet grip performance, and rolling resistance is the use of different styrene-butadiene copolymers with differing styrene and vinyl contents and differing modifications in the rubber mixtures, wherein the above-described problem of conflicting objectives arises in this case as well.

WO 2009007167 A1 discloses the use of two different polymers with differing glass transition temperatures in order to improve wet grip.

Also for the purpose of improving wet grip, EP 0659821 A1 discloses the use of 20 to 80 phr of diene rubber, in this specific case natural rubber, and 80 to 20 phr of styrene-butadiene copolymer having a glass transition temperature between −50° C. and −25° C. The use of 10 to 50 phr of diene rubber, here styrene-butadiene rubber, having a glass transition temperature of less than −45° C. to improve the ratio of dry to wet gripping is described in EP 1253170 A1. In U.S. Pat. No. 6,812,288, on the other hand, 5 to 40 phr of styrene-butadiene copolymer having a glass transition temperature of −35° C. or higher and 95 to 60 phr of diolefin rubber having a glass transition temperature of −20° C. or less are used to improve the shock-absorption properties ("vibration-isolating properties") of the rubber mixture.

DE 40 01 822 C2 describes a rubber mass comprising 10 to 100 parts by weight of a solution-polymerized styrene-butadiene rubber having a vinyl content of 20 to 70 wt % and a styrene content of 54.5 to 65 wt %, 0 to 90 parts by weight of an emulsion-polymerized styrene-butadiene rubber having a glass transition temperature of at least −60° C. and a styrene content of 20 to 65 wt %, and at least 70 parts by weight of carbon black, which are mixed into this rubber mass. This rubber mass is intended for use in running surfaces of high-performance tires with major hysteresis loss, high heat resistance, and a substantial grip.

Moreover, U.S. Pat. No. 5,901,766 describes a pneumatic tire with a sulfur-vulcanizable composition that is characterized by containing 50 to 90 phr of a rubber having a glass transition temperature in the range of −80° C. to −110° C., 10 to 50 phr of at least one rubber having a glass transition temperature in the range of −79° C. to +20° C., and 15 to 50 phr of a resin that is not a rubber. This mixture shows improved laboratory properties, which correlate with improved tire wear and concomitant improvement in grip and road behavior.

However, the improvement in grip behavior due to increased hysteresis loss, that is, greater than tan δ at 0° C., is known to be accompanied by deterioration of rolling resistance properties, that is, shock absorption during driving, which can be seen, for example, in U.S. Pat. No. 5,901,766 from the simultaneous increase in tan δ at 60° C. in ESBR and BR-containing rubber mixtures.

In order to optimize rolling resistance behavior or optimize various other properties of rubber mixtures that are relevant for use in tires without impairing rolling resistance behavior, the method is known of functionalizing the diene rubber used in such a way that binding to the filler(s) takes place.

Thus, for example, U.S. Pat. No. 8,450,424 discloses a rubber mixture that contains at least one aliphatic and/or aromatic hydrocarbon resin, at least one filler, and at least one functionalized diene rubber, whose functionalization takes place along and/or at the end of the polymer chain and allows binding to fillers. The hydroxy groups in Table 1 are disclosed as functionalizations for binding of the polymers to silica.

U.S. Pat. No. 8,426,512 discloses a rubber mixture that contains equal amounts of silica, carbon black, and functionalized polymers, with the use of 50 phr of polybutadiene functionalized with siloxy or siloxy aldimine groups instead of 50 phr of unfunctionalized polybutadiene being disclosed, among other uses. Such a rubber mixture shows improved rolling resistance indicators (rebound 100° C.), while the wet grip properties become poorer (rebound 23° C.). The effect on tear properties, in particular tear propagation properties, is not disclosed in U.S. Pat. No. 8,426,512.

EP 1963110 B1 discloses polymers modified with silane sulfide having a glass transition temperature of −23 to −28° C., which make it possible to achieve in a rubber mixture low values for the loss factor tan delta (tan δ) at 60° C., with the other properties otherwise being well-balanced.

U.S. Pat. No. 7,241,842 discloses a styrene-butadiene rubber that bears polyorganosiloxane groups containing epoxy groups as a functionalization, with three or more polymer chains being linked to one polyorganosiloxane group. When this polymer is combined with an unfunctionalized butadiene rubber in a silica-containing rubber mixture, this provides improved rolling resistance, wear and wet grip properties.

SUMMARY OF THE INVENTION

An object of the invention is therefore to provide a rubber mixture, in particular for vehicle tires, straps, belts, and hoses, which exhibits further improvement in rolling resistance behavior and wear behavior, with the further physical properties remaining at the same level, or in particular the tear properties and/or wet grip properties also being further optimized. In addition, the rubber mixture should optionally show an improvement in winter properties and/or handling behavior.

This object is achieved by means of a rubber mixture containing at least the following constituents:
  5 to 95 phr of at least one styrene-butadiene rubber, which is functionalized with phthalocyanine groups and/or hydroxy groups and/or epoxy groups and/or silane sulfide groups, has a styrene content of 0 to 12 wt %, and has a glass transition temperature ($T_g$) in the vulcanized state according to DSC of −75 to −120° C.,
  5 to 95 phr of at least one further rubber, and
  20 to 300 phr of at least one silica.

Surprisingly, it was found that the combination of a styrene-butadiene rubber with the aforementioned properties with at least one further rubber and 20 to 300 phr of silica in the rubber mixture yields an optimization of physical properties, such as in particular rolling resistance behavior and wear properties.

At the same time, the other tire properties remain at an approximately equally high level or are even improved, with the wet grip behavior and/or tear properties and/or dry braking behavior and/or winter properties and/or handling behavior of the rubber mixture in particular remaining at an approximately equally high level or even being improved.

The unit used in this disclosure of phr (parts per hundred parts of rubber by weight) is the unit commonly used in the rubber industry for indicating amounts in mixing recipes. The amounts in parts by weight of the individual substances given in this disclosure refer to 100 parts by weight of the total weight of all high-molecular and thus solid rubbers present in the mixture.

As mentioned above, rubbers with a low glass transition temperature were formerly used in a rubber mixture in combination with a rubber with a high $T_g$ in order to precisely adjust the glass transition temperature of the rubber mixture so as to improve rolling resistance in particular. By means of the present disclosure, these rubbers can be replaced with at least one styrene-butadiene rubber having a glass transition temperature ($T_g$) in the range of −120° C. to −75° C. functionalized with phthalocyanine groups and/or hydroxy groups and/or epoxy groups and/or silane sulfide groups, which surprisingly produces an additional marked improvement in wear behavior.

As the $T_g$ of styrene-butadiene rubber functionalized with phthalocyanine groups and/or hydroxy groups and/or epoxy groups and/or silane sulfide groups is generally below that of previously used functionalized styrene-butadiene rubbers, the amount of styrene-butadiene rubbers with a higher $T_g$ can also simultaneously be increased in order to take further advantage of the favorable properties of so-called "high-$T_g$ styrene-butadiene rubber."

In a preferred embodiment, the functionalized styrene-butadiene rubber used in the rubber mixture is functionalized with phthalocyanine groups and/or hydroxy groups and/or epoxy groups and/or silane sulfide groups.

Within the scope of the present disclosure, the phrase functionalized with phthalocyanine groups and/or hydroxy groups and/or epoxy groups and/or silane sulfide groups means that the rubber carries a plurality of these groups along the polymer chain and/or carries at least one phthalocyanine group and/or hydroxy group and/or epoxy group and/or silane sulfide group at the end of each polymer chain. In this case, it is also possible that not all polymer chains have a phthalocyanine group and/or hydroxy group and/or epoxy group and/or silane sulfide group. The percentage by weight of functionalized polymer chains is preferably 30 to 100 wt %, particularly preferably 50 to 100 wt %, and most particularly preferably 70 to 100 wt %.

Preferably, the polymer chains are functionalized at their ends with at least one phthalocyanine group and/or hydroxy group and/or epoxy group and/or silane sulfide group.

The functionalized styrene-butadiene rubber is preferably produced by anionic polymerization. Here, the living anionic polymer chains react with one or a plurality of modifier compounds, resulting in binding of the functional group(s) to them.

According to a preferred embodiment, the functionalized styrene-butadiene rubber is functionalized with at least one hydroxy group and/or at least one silane sulfide group. Within the meaning of the present disclosure, silane sulfide group refers to an organic residue containing at least one sulfur atom and at least one substituted silyl group —$SiR_3$.

In a preferred embodiment, the silane sulfide groups contain one or a plurality of sulfur atom(s).

It was found that with a functionalized styrene-butadiene rubber functionalized with at least one silane sulfide group, as compared to a functionalized styrene-butadiene rubber functionalized with siloxy, siloxane, siloxy-aldimine or aminosiloxane groups which, however, are sulfur-free, that is, contain no sulfur atoms, rubber mixtures having improved physical properties are obtained, such as in particular improved rolling resistance indicators and/or improved wear behavior and/or improved tear properties and/or improved handling predictors, such as in particular increased stiffness and/or improved wet grip properties.

According to a further preferred embodiment, the functionalized styrene-butadiene rubber is produced by reacting the living polymer chains in anionic polymerization with a silane sulfide modifier according to Formula (I):

$$(R''O)_x(R)_y Si—R'—S—SiR_3 \quad (I)$$

where the residues R are $C_1$-$C_{16}$ alkyl or benzyl groups that are independent from one another; R" is a $C_1$-$C_4$ alkyl group; R' is selected from $C_6$-$C_{18}$ aryl, $C_7$-$C_{50}$ alkylaryl, $C_1$-$C_{50}$ alkyl, and $C_2$-$C_{50}$ dialkyl ether (that is, alkyl-O-alkyl-), where each group is optionally substituted with one or a plurality of groups selected from the group composed of $C_1$-$C_4$ alkyl, $C_1$-$C_4$ alkoxy, $C_6$-$C_{12}$ aryl, $C_7$-$C_{16}$ alkylaryl, di($C_1$-$C_7$ hydrocarbyl)amino, bis(tri($C_1$-$C_{12}$ alkyl)silyl) amino, tris($C_1$-$C_7$ hydrocarbyl)silyl, and $C_1$-$C_{12}$ thioalkyl;
x is a whole number selected from the numbers 1, 2 and 3;
y is a whole number selected from the numbers 0, 1 and 2; and x+y=3.

It is assumed that the reaction of the anionic polymer chains with the silane sulfide modifier according to Formula (I) yields a modified polymer according to Formula (II):

$$(D)_z(R''O)_x(R)_y Si—R'—S—SiR_3 \quad (II)$$

wherein D is an elastic polymer;
x is a whole number selected from the numbers 0, 1 and 2;
y is a whole number selected from the numbers 0, 1 and 2;
z is a whole number selected from the numbers 1, 2 and 3;
x+y+z=3;
and R, R" and R' are defined according to Formula (I).

A styrene-butadiene rubber functionalized in this manner is functionalized with silane sulfide groups, as can be seen Formula (II).

It is further assumed that on contact with moisture, the polymer at least partially yields a modified polymer according to Formula (III):

$$(D)_z(HO)_x(R)_y Si—R'—S—SiR_3 \quad (III)$$

wherein D is an elastic polymer;
x is a whole number selected from the numbers 0, 1 and 2;
y is a whole number selected from the numbers 0, 1 and 2;
z is a whole number selected from the numbers 1, 2 and 3;
x+y+z=3;
and R and R' are defined according to Formula (I).

According to a preferred embodiment of the invention, each R in Formula (I) is independently selected from $C_1$-$C_5$ alkyl groups, and R' is a $C_1$-$C_5$ alkyl group.

According to a further preferred embodiment, the functionalized styrene-butadiene rubber is produced by reacting the living polymer chains in anionic polymerization with at least one silane sulfide modifier according to Formulae (1) and (2) and at least one silane sulfide modifier according to Formulae (3), (4), (5) and (6):

$$(R^1O)_3 Si—R^4—S—SiR^3_3 \quad (1)$$

$$(R^{13}O)_3 Si—R^9—N(SiR^{10}R^{11}R^{12})_2 \quad (2)$$

$$(R^1O)_x(R^2)_y Si—R^4—S—SiR^3_3 \quad (3)$$

$$(R^{13}O)_p(R^{14})_q Si—R^9—N(SiR^{10}R^{11}R^{12})_2 \quad (4)$$

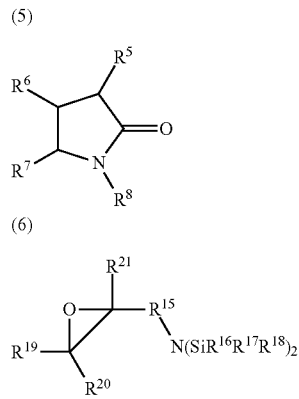

where $R^2$, $R^3$, $R^{10}$, $R^{11}$, $R^{12}$, $R^{14}$, $R^{16}$, $R^{17}$ and $R^{18}$ are selected independently from one another from $C_1$-$C_{16}$ alkyl and benzyl groups, and where the alkyl groups for the residues $R^{10}$, $R^{11}$ and $R^{12}$ and for $R^{16}$, $R^{17}$ and $R^{18}$ may be bound to one another in the form of a ring containing two silicon atoms and nitrogen (N); and
$R^1$ and $R^{13}$ are selected independently from one another from $C_1$-$C_4$ alkyl groups; and
$R^4$, $R^9$ and $R^{15}$ are selected independently from one another from $C_6$-$C_{18}$ aryl, $C_7$-$C_{50}$ alkylaryl, $C_1$-$C_{50}$ alkyl and $C_2$-$C_{50}$ dialkyl ether (that is, alkyl-O-alkyl-),
where each group is optionally substituted with one or a plurality of groups selected from the group composed of $C_1$-$C_4$ alkyl, $C_1$-$C_4$ alkoxy, $C_6$-$C_{12}$ aryl, $C_7$-$C_{16}$ alkylaryl, di($C_1$-$C_7$ hydrocarbyl)amino, bis(tri($C_1$-$C_{12}$ alkyl)silyl) amino, tris($C_1$-$C_7$ hydrocarbyl)silyl, and $C_1$-$C_{12}$ thioalkyl;
$R^5$, $R^6$ and $R^7$ are selected independently from one another from hydrogen (—H), $C_1$-$C_{16}$ alkyl, and $C_6$-$C_{12}$ aryl;
$R^8$ is selected from $C_1$-$C_{16}$ alkyl and $C_6$-$C_{12}$ aryl;
$R^{19}$, $R^{20}$ and $R^{21}$ are selected independently from one another from hydrogen and $C_1$-$C_{16}$ alkyl;
x and p respectively are whole numbers selected from the numbers 1 and 2;
y and q respectively are whole numbers selected from the numbers 1 and 2;
x+y=3; and
p+q=3.

According to a particularly preferred embodiment, the functionalized styrene-butadiene rubber is produced by reacting the living polymer chains in anionic polymerization with at least one silane sulfide modifier according to Formula (IV):

$$(MeO)_2(Me)Si—(CH_2)_2—S—SiMe_2C(Me)_3 \quad (IV)$$

The compound according to Formula (IV) is an example of the silane sulfide modifier according to Formula (3).

Using this type of modified styrene-butadiene rubber, particularly significant improvements with respect to the rolling resistance and/or wear behavior of the rubber mixture are achieved.

According to a further particularly preferred embodiment, the functionalized styrene-butadiene rubber is produced by reacting living polymer chains in anionic polymerization with a silane sulfide modifier according to Formula (IV) and Formula (V):

$$(MeO)_2(Me)Si—(CH_2)_2—S—SiMe_2C(Me)_3 \quad (IV)$$

$$(MeO)_3 Si—(CH_2)_2—S—SiMe_2C(Me)_3 \quad (V)$$

The compound according to Formula (V) is an example of the silane sulfide modifier according to Formula (1).

With this type of modified styrene-butadiene rubber, particularly significant improvements with respect to the rolling resistance and/or wear behavior of the rubber mixture are achieved.

The aforementioned solution-polymerized styrene-butadiene rubber shows in the unvulcanized state a glass transition temperature of −75° C. to −120° C. (minus 75 to minus 120° C.) preferably −75 to −110° C., particularly preferably −80 to −110° C., and most particularly preferably −80° C. to −100° C., and can therefore be considered to be a styrene-butadiene rubber with a relatively low glass transition temperature. In the rubber mixture according to the disclosure, this styrene-butadiene rubber therefore replaces known diene rubbers having a low glass transition temperature, in particular butadiene rubber (=BR, polybutadiene), while simultaneously improving rolling resistance behavior.

Moreover, in a preferred embodiment, the functionalized styrene-butadiene rubber used in the rubber mixture has a styrene content of 0 to 12 wt %. This means that at 0 wt % of styrene a butadiene rubber is present.

According to a preferred embodiment, the styrene content of the styrene-butadiene rubber is 0 to 2 wt %, and particularly preferably 0 wt %.

According to a further preferred embodiment, the styrene content of the styrene-butadiene rubber is 0.1 to 12 wt %, particularly preferably 5 to 12 wt %, and most particularly preferably 9 to 11 wt %.

The solution-polymerized styrene-butadiene rubber preferably has a vinyl content with respect to the butadiene content of 1 to 30 wt %, preferably 1 to 15 wt %, particularly preferably 5 to 12 wt %, more particularly preferably 7 to 12 wt %, and even more particularly preferably 7 to 11 wt %. This allows a low glass transition temperature of the polymer to be achieved.

Determination of the styrene content and vinyl content of the butadiene portion of the polymers discussed in the scope of the present disclosure is carried out by $^{13}$C-NMR (solvent: deuterochloroform CDCl$_3$; NMR: "nuclear magnetic resonance") and comparison with data from infrared spectrometry (IR; FT-IR spectrometer from the firm Nicolet, KBr window 25 mm in diameter×5 mm, 80 mg of sample in 5 mL of 1,2-dichlorobenzene). Determination of the glass transition temperature ($T_g$) of the polymers (in particular the functionalized styrene-butadiene rubber) is carried out by means of dynamic differential calorimetry (dynamic scanning calorimetry, DSC, according to DIN 53765: 1994-03 or ISO 11357-2: 1999-03, calibrated DSC with low-temperature device, calibration according to device type and manufacturer's instructions, sample in an aluminum crucible with an aluminum lid, cooling to temperatures lower than −120° C. at 10° C./min).

The above functionalized styrene-butadiene rubber preferably has a Mooney viscosity (ML 1+4, 100° C. according to ASTM D 1646 (2004)) of 20 to 200 Mooney units (MU), particularly preferably 25 to 150, and most particularly preferably 25 to 100.

The preferred molecular weight distribution of the functionalized styrene-butadiene rubber, Mw/Mn, is between 1.2 and 3.0.

If Mw/Mn is less than 1.2, this results in poor processability of the polymer and the rubber mixture, and poor distribution of the constituents, in particular poor filler dispersion of the rubber mixture. If Mw/Mn is greater than 3.0, the amount of components with a low molecular weight is too high, resulting in increased hysteresis and thus poor rolling resistance behavior of the rubber mixture.

The above functionalized styrene-butadiene rubber is used in the rubber mixture in amounts of 5 to 95 phr, preferably 20 to 95 phr, particularly preferably 40 to 95 phr, more particularly preferably 60 to 95 phr, and most particularly preferably in amounts of 70 to 90 phr.

In a preferred embodiment, the styrene-butadiene rubber functionalized with phthalocyanine groups and/or hydroxy groups and/or epoxy groups and/or silane sulfide groups has a styrene content of 0 wt % and a vinyl content of 1 to 15 wt %, particularly preferably 7 to 12 wt %.

The styrene-butadiene rubber functionalized with phthalocyanine groups and/or hydroxy groups and/or epoxy groups and/or silane sulfide groups can be solution-polymerized or emulsion-polymerized. Preferably, it is a solution-polymerized styrene-butadiene rubber S(S)BR with a styrene content of 0 to 12 wt %.

The rubber mixture also contains 5 to 95 phr, preferably 5 to 80 phr, particularly preferably 5 to 60 phr, more particularly preferably 5 to 40 phr, and most particularly preferably 10 to 30 phr of at least one further rubber.

The at least one further rubber is in this case selected from the group consisting of natural polyisoprene and/or synthetic polyisoprene and/or butadiene rubber and/or solution-polymerized styrene-butadiene rubber and/or emulsion-polymerized styrene-butadiene rubber and/or liquid rubbers with a molecular weight Mw greater than 20,000 g/mol and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluorine rubber and/or silicone rubber and/or polysulfide rubber and/or epichlorohydrin rubber and/or styrene-isoprene-butadiene terpolymer and/or hydrated acrylonitrile butadiene rubber and/or isoprene-butadiene copolymer and/or hydrated styrene-butadiene rubber.

In particular, nitrile rubber, hydrated acrylonitrile butadiene rubber, chloroprene rubber, butyl rubber, halobutyl rubber, or ethylene-propylene-diene rubber are used in the production of technical rubber articles such as straps, belts, and hoses.

Preferably, the further rubber is at least one diene rubber selected from the group consisting of synthetic polyisoprene and natural polyisoprene (NR) and styrene-butadiene rubber and polybutadiene (BR).

The natural polyisoprene and synthetic polyisoprene may be of all types known to the person skilled in the art. Preferably, the further diene rubber is at least natural polyisoprene. This allows particularly favorable processability (extrudablity, miscibility, et cetera) of the rubber mixture to be achieved. In the scope of the present disclosure, the styrene-butadiene rubber from the group of further diene rubbers is a conventional styrene-butadiene rubber, and can therefore be used in a blend with the solution-polymerized styrene-butadiene rubber (SSBR), which is functionalized with phthalocyanine groups and/or hydroxy groups and/or epoxy groups and/or silane sulfide groups, has a styrene content of 0 to 12 wt %, and has a glass transition temperature $T_g$ in the unvulcanized state according to DSC of −75 to −120° C.

According to a further preferred embodiment, the rubber mixture contains 5 to 95 phr of at least one natural polyisoprene and/or 5 to 95 phr of at least one synthetic polyisoprene, preferably 5 to 20 phr of at least one natural polyisoprene and/or 5 to 20 phr of at least one synthetic polyisoprene.

According to another preferred embodiment, the rubber mixture contains 5 to 15 phr of at least one natural and/or synthetic polyisoprene in combination with 85 to 95 phr of the functionalized styrene-butadiene rubber described above having a $T_g$ of −100 to −87° C., with the mixture in this embodiment particularly preferably having a styrene content of 0 to 2 wt %, and more particularly preferably 0 wt %. Compared to a conventional rubber mixture containing the same amount of butadiene rubber having a $T_g$ of −105° C., this type of rubber mixture shows improved wear properties and improved rolling resistance behavior, with the other tire properties not being significantly impaired and/or remaining the same. In particular, wet grip behavior and tear properties remain at a level acceptable for use in the treads of vehicle tires.

According to a further preferred embodiment, the rubber mixture contains 45 to 55 phr of at least one carbon black, preferably a carbon black of the type N339, 40 to 50 phr of silicic acid, and 5 to 15 phr of at least one natural and/or synthetic polyisoprene in combination with 85 to 95 phr of the above-described functionalized styrene-butadiene rubber having a $T_g$ of −100 to −87° C., with the rubber in this embodiment particularly preferably having a styrene content of 0 to 2 wt %, and most particularly preferably 0 wt %. Compared to a conventional rubber mixture containing the same amount of butadiene rubber having a $T_g$ of −105° C., this type of rubber mixture shows improved wear properties, improved rolling resistance behavior, and the same and/or increased stiffness as an indicator of the same and/or improved handling behavior, with the other tire properties not being significantly impaired or remaining the same. In particular, wet grip behavior and tear properties remain at a level acceptable for use in treads of vehicle tires.

According to a further preferred embodiment, the rubber mixture contains 30 to 45 phr of at least one natural polyisoprene and/or 55 to 70 phr of at least one synthetic polyisoprene, with natural polyisoprene being particularly preferred, in combination with 55 to 70 phr of the above-described functionalized styrene-butadiene rubber having a $T_g$ of 100 to 87° C., and in this embodiment, this rubber particularly preferably has a styrene content of 0 to 2 wt %, and even more particularly preferably 0 wt %. In this embodiment, the rubber mixture shows improved rolling resistance and wet braking, wear, and dry braking properties compared to conventional rubber mixtures. In this embodiment, 5 to 10 phr of a carbon black, preferably of the type N121, is preferably used in combination with 70 to 80 phr of a silica. Moreover, it is preferable if no further rubber is contained in this embodiment.

According to a preferred embodiment, the rubber mixture contains 30 to 50 phr of the above-described functionalized styrene-butadiene rubber having a $T_g$ of −100 to −87° C., with the rubber in this embodiment particularly preferably having a styrene content of 0 to 2 wt %, and most particularly preferably 0 wt %, 5 to 10 phr of natural polyisoprene, and 40 to 60 phr of at least one further styrene-butadiene rubber. This type of rubber mixture shows particularly advantageous wear and wet grip properties, without any adverse effects on rolling resistance.

In a further preferred embodiment, the rubber mixture contains 5 to 95 phr, particularly preferably 5 to 65 phr, and most particularly preferably 10 to 55 phr of at least one solution-polymerized styrene-butadiene rubber that is functionalized with phthalocyanine groups and/or hydroxy groups and/or epoxy groups and/or silane sulfide groups, has a styrene content of 0 to 12 wt %, has a glass transition temperature $T_g$ in the unvulcanized state according to DSC of −75 to −120° C., and contains 5 to 70 phr, particularly preferably 35 to 70 phr, and most particularly preferably 45 to 55 phr, of at least one further diene rubber. Particularly preferably, the at least one further diene rubber constitutes two different diene rubbers. Also, particularly preferably, the two different diene rubbers are styrene-butadiene rubber and natural polyisoprene.

With such a composition of the polymer system, it is possible to set the same glass transition temperature $T_g$ of the rubber mixture with improved rolling resistance indicators and improved wear behavior without deterioration of the other tire properties of the rubber mixture compared to the prior art.

According to a further preferred embodiment, the rubber mixture contains 5 to 15 phr of at least one natural and/or synthetic polyisoprene in combination with 85 to 95 phr of the above-described styrene-butadiene rubber having a $T_g$ of −87 to −80° C. functionalized with silane sulfide groups, with the rubber in this embodiment particularly preferably having a styrene content of 9 to 11 wt %, and most particularly preferably 10 wt %. Compared to a rubber mixture containing the same amount of a conventional butadiene rubber having a $T_g$ of −105° C., this type of rubber mixture shows improved rolling resistance behavior, with the other tire properties not being significantly impaired and/or remaining the same. In particular, wet grip behavior and tear properties remain at a level acceptable for use in treads of vehicle tires.

According to a further preferred embodiment, the rubber mixture contains 15 to 25 phr of at least one natural and/or synthetic polyisoprene in combination with 24 to 34 phr of a solution-polymerized styrene-butadiene rubber from the prior art having a glass transition temperature of −40 to +10° C. (minus 40 to plus 10° C.), preferably −30 to −20° C. (minus 30 to minus 20), (high-$T_g$ SSBR) and 46 to 56 phr of the above-described styrene-butadiene rubber functionalized with silane sulfide groups having a $T_g$ of −87 to −80° C., with the rubber in this embodiment particularly preferably having a styrene content of 9 to 11 wt %, and most particularly preferably 10 wt %.

This type of rubber mixture replaces a conventional rubber mixture with the same glass transition temperature, in which, by using the functionalized styrene-butadiene rubber having a $T_g$ of −87 to −80° C. described, the amount of high-$T_g$ SSBR can be increased at the same time, which leads to simultaneous improvement of rolling resistance behavior and wear properties, with the other tire properties remaining at virtually the same level.

According to a further preferred embodiment, the rubber mixture contains 10 to 70 phr of a solution-polymerized styrene-butadiene rubber from the prior art having a glass transition temperature of −40 to +10° C. (high-$T_g$ SSBR) and 10 to 70 phr of the styrene-butadiene rubber having a $T_g$ of −120 to −75, preferably −110 to −75, particularly preferably −110 to −80° C., and most particularly preferably −87 to −80° C. functionalized with phthalocyanine groups and/or hydroxy groups and/or epoxy groups and/or silane sulfide groups, particularly preferably with silane sulfide groups as described above, with the rubber in this embodiment preferably having a styrene content of 1 to 12 wt %, particularly preferably 9 to 11 wt %, and most particularly preferably 10 to 11 wt %. The rubber mixture may also contain at least one further diene rubber, in particular natural and/or synthetic polyisoprene.

When this type of rubber mixture is used to replace a conventional rubber mixture having the same glass transition temperature, it is possible to simultaneously increase the amount of high-$T_g$ SSBR by using the described functionalized styrene-butadiene rubber having a $T_g$ of −120 to −75° C., preferably −110 to −75° C., particularly preferably −110 to −80° C., and most particularly preferably −87 to −80° C., which at the same time causes improvement in rolling resistance behavior and wear properties, with the other tire properties remaining at virtually the same level.

The rubber mixture preferably contains 20 to 300 phr, preferably 20 to 150 phr, particularly preferably 40 to 150 phr, and most particularly preferably 80 to 110 phr of at least one silica.

The rubber mixture can, in addition to silica, also contain further known polar and/or non-polar fillers, such as, for example, carbon black.

The silicas may be silicas known to the person skilled in the art that are suitable as fillers for tire rubber mixtures. However, it is particularly preferred to use a finely dispersed, precipitated silica having a nitrogen surface area (BET surface area) (according to DIN ISO 9277 and DIN 66132) of 35 to 350 m²/g, preferably 35 to 260 m²/g, particularly preferably 100 to 260 m²/g, and most particularly preferably 130 to 235 m²/g and a CTAB surface area (according to ASTM D 3765) of 30 to 400 m²/g, preferably 30 to 250 m²/g, particularly preferably 100 to 250 m²/g, and most particularly preferably 125 to 230 m²/g. Such silicas, when used, for example, in rubber mixtures for tire treads, produce particularly favorable physical properties of the vulcanizate. This can also provide advantages in mixture processing by reducing mixing time while retaining the same product properties, which lead to improved productivity. As silicas, one can both use, for example, those of the Ultrasil® VN3 type (brand name) from the firm Evonik and highly-dispersible silicic acids such as the aforementioned HD silicic acids (for example, Zeosil® 1165 MP from the firm Rhodia).

A coupling agent in the form of silane or a silicon organic compound is preferably used. Here, one or a plurality of different silane coupling agents in combination with one another may be used. The rubber mixture may therefore contain a mixture of various silanes. The silane coupling agents react with the superficial silanol groups of the silica or other polar groups during the mixing of the rubber or of the rubber mixture (in situ), or even before adding the filler to the rubber as a pretreatment (premodification). All silane coupling agents known to the person skilled in the art as silane coupling agents for use in rubber mixtures may be used. Examples of known coupling agents are bifunctional organosilanes possessing at least one alkoxy, cycloalkoxy, or phenoxy group on the silicon atom as a leaving group, and as the other functionality, having a group that can optionally undergo a chemical reaction with the double bonds of the polymer after splitting. The latter group may, for example, constitute the following chemical groups: SCN, —SH, —NH$_2$ or —S$_x$— (where x=2 to 8).

As silane coupling agents, one can therefore use, for example, 3-mercaptopropyltriethoxysilane, 3-thiocyanatopropyltrimethoxysilane, or 3,3'-bis(triethoxysilylpropyl) polysulfide with 2 to 8 sulfur atoms such as, for example, 3,3'-bis(triethoxysilylpropyl)tetrasulfide (TESPT), the corresponding disulfide (TESPD), or mixtures of the sulfides with 1 to 8 sulfur atoms having a differing content of the various sulfides. For example, TESPT can also be added as a mixture with industrial carbon black (brand name X50S° from the firm Evonik).

Preferably, a silane mixture is used that contains up to 40 to 100 wt % of disulfides, particularly preferably 55 to 85 wt % of disulfides, and most particularly preferably 60 to 80 wt % of disulfides.

Blocked mercaptosilanes such as those known from WO 99/09036 can also be used as silane coupling agents. Silanes such as those described in U.S. Pat. Nos. 7,968,633; 7,968,636; 7,968,635; and, 7,968,634 may also be used. Suitable are, for example, silanes marketed under the name NXT in different variants by the firm Momentive, USA, or those marketed under the name VP Si 363® by the firm Evonik Industries.

The amount of the coupling agent is preferably 0.1 to 20 phr, and particularly preferably 1 to 15 phr.

According to a preferred embodiment, the rubber mixture contains 80 to 110 phr of silica. This produces particularly favorable wear properties with simultaneously favorable tear properties and improved dry braking properties. This preferred embodiment also preferably contains 2 to 15, and particularly preferably 2 to 10 phr of carbon black in the rubber mixture.

According to a particularly advantageous embodiment of the invention, the rubber mixture contains 40 to 60 phr of at least one carbon black. This provides a particularly marked improvement in wear properties compared to the prior art while simultaneously increasing stiffness, so that handling behavior is further improved. At the same time, this rubber mixture shows a particularly marked improvement in rolling resistance properties. This embodiment of the invention therefore better alleviates the conflict of objectives among the properties of rolling resistance, wear, and handling compared to conventional rubber mixtures.

All types of carbon black known to the person skilled in the art may be used.

In one embodiment, the carbon black has an iodine number according to ASTM D 1510, also referred to as the iodine absorption number, of 30 g/kg to 250 g/kg, preferably 30 to 180 g/kg, particularly preferably 40 to 180 g/kg, and most particularly preferably 40 to 130 kg/g, and a DBP number according to ASTM D 2414 of 80 to 200 ml/100 g, preferably 100 to 200 ml/100 g, and particularly preferably 115 to 200 ml/100 g.

The DBP number according to ASTM D 2414 determines the specific absorption volume of a carbon black or a light filling using dibutyl phthalate.

The use of this type of carbon black in the rubber mixture, in particular for vehicle tires, ensures the best possible compromise between wear resistance and heat buildup, which in turn influences the ecologically relevant rolling resistance. In this case it is preferable to use only one type of carbon black in the respective rubber mixture, but different types of carbon black may also be mixed into the rubber mixture.

Moreover, it is possible for the rubber mixture to contain carbon nanotubes (CNT), including discrete CNTs, so-called hollow carbon fibers (HCF), and modified CNT containing one or a plurality of functional groups such as hydroxy, carboxy, and carbonyl groups.

Graphite, graphene, and so-called "carbon-silica dual-phase fillers" are suitable as fillers.

Moreover, the rubber mixture may also contain other polar fillers, such as, for example, aluminosilicates, chalk, starch, magnesium oxide, titanium dioxide, or rubber gels.

The rubber mixture may also contain 0 to 70 phr, preferably 0.1 to 60 phr, and more preferably 0.1 to 50 phr of at least one plasticizer.

These include all plasticizers known to the person skilled in the art, such as aromatic, naphthenic, or paraffinic mineral oil plasticizers, for example, MES (mild extraction solvate) or TDAE (treated distilled aromatic extract), rubber-to-liquid (RTL) oils or biomass-to-liquid (BTL) oils, factices, plasticizing resins, or liquid polymers (such as liquid BR), whose average molecular weight (determination by GPC=gel permeation chromatography, based on BS ISO 11344:2004), is between 500 and 20,000 g/mol. If liquid polymers are used in the rubber mixture according to the invention as plasticizers, these are not included as rubber in calculating the composition of the polymer matrix.

If a mineral oil is used, it is preferably selected from the group composed of DAE (distillated aromatic extracts) and/or RAE (residual aromatic extracts) and/or TDAE (treated distillated aromatic extracts) and/or MES (mild extracted solvents) and/or naphthenic oils.

Moreover, the rubber mixture according to the invention can contain common additives in the common number of parts by weight. These additives include
a) antioxidants such as, for example, N-phenyl-N'-(1,3-dimethylbutyl)-p-phenylene diamine (6PPD), N,N'-diphenyl-p-phenylene diamine (DPPD), N,N'-ditolyl-p-phenylene diamine (DTPD), N-isopropyl-N'-phenyl-p-phenylene diamine (IPPD), and 2,2,4-trimethyl-1,2-dihydroquinoline (TMQ),
b) activators such as, for example, zinc oxide and fatty acids (for example, stearic acid),
c) waxes,
d) resins, in particular adhesive resins,
e) mastication auxiliaries such as, for example, 2,2'-dibenzamidodiphenyldisulfide (DBD), and
f) processing auxiliaries, for example, fatty acid salts such as, for example, zinc soaps, fatty acid esters and derivatives thereof.

In particular, in the use of the rubber mixture according to the invention for the internal components of a tire or a technical rubber article that are in direct contact with the reinforcing supports present, a suitable adhesive system, often in the form of adhesive resins, is also generally added to the rubber.

The proportion of further additives contained in the entire amount is 3 to 150 phr, preferably 3 to 100 phr, and particularly preferably 5 to 80 phr.

The proportion of further additives contained in the entire amount also includes 0.1 to 10 phr, preferably 0.2 to 8 phr, and particularly preferably 0.2 to 4 phr of zinc oxide (ZnO).

This zinc oxide may be of any type known to the person skilled in the art, such as, for example, ZnO granulate or powder. Generally speaking, conventionally used zinc oxide shows a BET surface area of less than 10 m²/g. However, so-called nano zinc oxide having a BET surface area of 10 to 60 m²/g can also be used.

Vulcanization is carried out in the presence of sulfur or sulfur donors using vulcanization accelerators, with some vulcanization accelerators also being capable of acting as sulfur donors. Sulfur or sulfur donors and one or a plurality of accelerators are added in the last mixing step in the aforementioned amounts to the rubber mixture. Here, the accelerator is selected from the group composed of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators.

A sulfenamide accelerator selected from the group composed of N-cyclohexyl-2-benzothiazole sufenamide (CBS) and/or N,N-dicyclohexylbenzothiazole-2-sulfenamide (DCBS) and/or benzothiazyl-2-sulfene morpholide (MBS) and/or N-tert-butyl-2-benzothiazyl sulfenamide (TBBS) is preferably used.

Further network-forming systems such as for example those available under the brand names Vulkuren®, Duralink® or Perkalink®, or network-forming systems such as those described in WO 2010/059402 A2, can also be used in the rubber mixture. This system contains a vulcanizing agent that crosslinks with a functionality greater than four and at least one vulcanization accelerator. The vulcanizing agent that crosslinks with a functionality greater than four has, for example, General Formula A):

$$G[C_aH_{2a}\text{—}CH_2\text{—}S_bY]_c \qquad A)$$

where G is a polyvalent cyclic hydrocarbon group and/or a polyvalent heterohydrocarbon group and/or a polyvalent siloxane group that contains 1 to 100 atoms; where each Y contains sulfur-containing functionalities independently selected from a rubber-active group; and where a, b and c are whole numbers for which the following applies independently: a equals 0 to 6; b equals 0 to 8; and c equals 3 to 5.

The rubber-active group is preferably selected from a thiosulfonate group, a dithiocarbamate group, a thiocarbonyl group, a mercapto group, a hydrocarbon group, and a sodium thiosulfonate group (colored salt group). This allows highly favorable wear and tear properties of the rubber mixture according to the invention to be achieved.

Within the scope of the present invention, sulfur and sulfur donors, including sulfur-donating silanes such as TESPT, vulcanization accelerators as described above, and vulcanizing agents that crosslink with a functionality of greater than four as described in WO 2010/059402 A2, such as, for example, a vulcanizing agent of Formula A), and the aforementioned systems Vulkuren®, Duralink®, and Perkalink®, are combined under the term vulcanizing agents.

The rubber mixture preferably contains at least one vulcanizing agent selected from the group containing sulfur and/or sulfur donors and/or vulcanization accelerators and/or vulcanizing agents which crosslink with a functionality of greater than four. This makes it possible to produce vulcanizates from the rubber mixture, in particular for use in vehicle tires. The rubber mixture preferably contains at least one vulcanizing agent selected from the group consisting of sulfur and/or sulfur donors and/or vulcanization accelerators and/or vulcanizing agents which crosslink with a functionality of greater than four. This makes it possible to produce vulcanizates from the rubber mixture, in particular for use in vehicle tires.

Vulcanization retarders may also be present in the rubber mixture.

According to another preferred embodiment, several accelerants are used. Preferably, a sulfenamide accelerator, particularly preferably CBS, is used in combination with the guanidine accelerator DPG (diphenyl guanidine). The amount of DPG is 0 to 5 phr, preferably 0.1 to 3 phr, particularly preferably 0.5 to 2.5 phr, and most particularly preferably 1 to 2.5 phr.

A further object of the present disclosure is to provide a vehicle tire that exhibits improved rolling resistance behavior and improved wear behavior. This object is achieved in that the vehicle tire contains the rubber mixture according to the disclosure in at least one component as described above. In this context, all of the aforementioned embodiments of the constituents and properties thereof apply.

Preferably, the component is a tread. As known to the person skilled in the art, the tread contributes to a relatively high degree to overall rolling resistance and decisively to wear of the tire.

A further object of the disclosure is to optimize the wear behavior of vehicle tires and technical rubber articles such as, for example, belts, straps, and hoses without having a significant negative effect on other properties that are relevant for the respective use.

This object is achieved by using the above-described rubber mixture for the production of vehicle tires, in particular for the production of the tread of a tire and/or a body mixture of a tire and for the production of technical rubber articles such as, for example, belts, straps, and hoses.

The term body mixture as used here refers to rubber mixtures for the internal components of a tire. Internal tire components essentially include the squeegee, side wall, inner liner (inner layer), core profile, belt, shoulder, belt profile, carcass ply, bead wire, cable profile, horn profile, and bandage.

Manufacturing of the rubber mixture according to the disclosure is carried out by the methods commonly used in the rubber industry, in which a basic mixture with all of the constituents except the vulcanization system (sulfur and vulcanization-affecting substances) is first produced in one or a plurality of mixing stages. The finished mixture is produced by adding the vulcanization system in a last mixing stage. The finished mixture is further processed, for example, by means of an extrusion process, and given the corresponding form.

For use in vehicle tires, the mixture is preferably made into a tread and applied in the known manner in production of the vehicle tire blank. However, the tread can also be wound onto a tire blank in the form of a narrow rubber mixture strip. In two-part treads (upper part: cap and lower part: base), the rubber mixture according to the disclosure can be used both for the cap and for the base.

Manufacturing of the rubber mixture for use as a body mixture in vehicle tires is carried out as described above for the tread. The difference lies in the molding after the extrusion process. The forms of the rubber mixture according to the disclosure obtained in this manner for one or a plurality of various body mixtures are then used to produce a tire blank. In order to use the rubber mixture in belts and straps, in particular in conveyor belts, the extruded mixture is made into the corresponding form and, at the same time or thereafter, often provided with reinforcing supports, for example, synthetic fibers or steel cords. In most cases, one obtains a multilayer structure composed of one and/or a plurality of layers of the rubber mixture, one and/or a plurality of layers of the same and/or different reinforcing supports, and one and/or a plurality of further layers of the same and/or another rubber mixture.

In use of the rubber mixture according to the disclosure in hoses, peroxide crosslinking is frequently preferred to the aforementioned sulfur crosslinking.

Manufacturing of the hoses is carried out analogously to the method described in Handbuch der Kautschuktechnologie [Handbook of Rubber Technology], Dr. Gupta Verlag, 2001, Chapter 13.4.

DESCRIPTION OF THE PREFERRED EMBODIMENTS OF THE INVENTION

The disclosure will now be explained in further detail by means of the comparative examples and exemplary embodiments summarized in Tables 1 and 2. Here, the mixtures marked with "E" are mixtures according to the invention, while the mixtures marked with "V" are comparison mixtures. In all of the mixing examples given in the Tables, the volume units are given in parts by weight with respect to 100 parts by weight of the total rubber (phr) or 100 parts by weight of silica (phf).

Mixture production was carried out under the usual conditions in three stages in a laboratory tangential mixer. Test pieces were produced from all of the mixtures by optimal vulcanization under pressure at 160° C., and these test pieces were used to determine the material properties typical for the rubber industry. The following test methods were used for testing of the test pieces described above:

Shore A hardness (unit Shore A, abbreviated ShA) at room temperature (RT) according to DIN 53 505

Rebound elasticity (abbreviated as rebound) at room temperature (RT) and 70° C. according to DIN 53 512

Tension values at 50, 100 and 300% elongation (modulus 50, modulus 100 or modulus 300) at room temperature (RT) according to DIN 53 504

Tensile strength and elongation at break at room temperature according to DIN 53 504

Wear at room temperature according to DIN53 516 or DIN/ISO 4649

Glass transition temperature $T_g$ of the rubber mixture from the loss factor tan δ (tangent delta) by dynamic mechanical measurement according to DIN 53 513 (temperature sweep)

Determination of the molecular weight (weight average Mw and number average Mn) of the polymers is carried out using gel permeation chromatography (GPC with tetrahydrofuran (THF) as an eluent at 40° C., calibrated with polystyrene-standard EasiCal PS-1; size exclusion chromatography (SEC).

Determination of the Mooney viscosities (ML 1+4, 100° C.) of the polymers used is carried out according to ASTM D 1646 (2004).

TABLE 1

| Constituents | Unit | V1 | E1 | E2 | E3 |
| --- | --- | --- | --- | --- | --- |
| NR TSR | phr | 10 | 10 | 10 | 10 |
| BR [a)] | phr | 90 | — | — | — |
| SSBR [b)] | phr | — | 90 | — | — |
| SSBR [c)] | phr | — | — | 90 | — |
| SSBR [d)] | phr | — | — | — | 90 |
| Silica [e)] | phr | 95 | 95 | 95 | 95 |
| Silane [f)] | phr | 6.84 | 6.84 | 6.84 | 6.84 |
| TDAE | phr | 35 | 35 | 35 | 35 |
| Antioxidant | phr | 4 | 4 | 4 | 4 |
| ZnO | phr | 2.5 | 2.5 | 2.5 | 2.5 |
| Stearic acid | phr | 2.5 | 2.5 | 2.5 | 2.5 |
| Accelerator [g)] | phr | 4 | 4 | 4 | 4 |
| Sulfur | phr | 2 | 2 | 2 | 2 |
| Shore hardness at RT | Shore A | 74 | 68 | 69 | 72 |
| Shore hardness at 70° C. | Shore A | 70 | 65 | 66 | 69 |
| Rebound elasticity at 70° C. | % | 45 | 51 | 54 | 55 |
| Tensile strength | MPa | 13 | 16 | 17.5 | 13.5 |
| Elongation at break | % | 441 | 528 | 533 | 454 |

TABLE 1-continued

| Constituents | Unit | V1 | E1 | E2 | E3 |
|---|---|---|---|---|---|
| Modulus 300 | MPa | 9.6 | 7.8 | 8.2 | 8.3 |
| $T_g$ of rubber mixture | °C. | −85 | −51 | −52 | −61 |

Substances used from Table 1:
[a)] BR: polybutadiene, high-cis, Nd-catalyzed butadiene rubber, unfunctionalized, $T_g$ = −105° C., Europrene ® NEOCIS BR 40, firm Polimeri
[b)] SSBR: styrene content = 10.4 wt %; vinyl content = 8.6 wt %; block styrene content = 5%; $T_g$ = −83° C.; $M_w$ = 515249 g/mol; $M_n$ = 356031 g/mol; Mooney viscosity = 64.1; modified with IV) (MeO)$_2$(Me)Si—(CH$_2$)$_2$—S—SiMe$_2$C(Me)$_3$
[c)] SSBR: styrene content = 10.5 wt %; vinyl content = 8.8 wt %; block styrene content = 9%; $T_g$ = −83° C.; $M_w$ = 475141 g/mol; $M_n$ = 343274 g/mol; Mooney viscosity = 65.5; modified with IV) (MeO)$_2$(Me)Si—(CH$_2$)$_2$—S—SiMe$_2$C(Me)$_3$ and V) (MeO)$_3$Si—(CH$_2$)$_2$—S—SiMe$_2$C(Me)$_3$
[d)] SSBR: styrene content = 0 wt %; vinyl content = 8 wt %; $T_g$ = −94° C.; modified with IV) (MeO)$_2$(Me)Si—(CH$_2$)$_2$—S—SiMe$_2$C(Me)$_3$ and V) (MeO)$_3$Si—(CH$_2$)$_2$—S—SiMe$_2$C(Me)$_3$
[e)] Silica: ULTRASIL ® VN3, firm Evonik
[f)] Silane Si 261 ®, firm Evonik
[g)] Accelerators: DPG (diphenyl guanidine) and CBS (N-cyclohexyl-2-benzothiazolsulfenamide)

As can be seen from Table 1, the rubber mixtures according to the invention E1, E2, and E3 surprisingly show greater rebound elasticity at 70° C. than V1, although the glass transition temperatures $T_g$ of E1, E2 and E3 respectively are higher than that of V1. A greater rebound elasticity at 70° C. is an indicator of improved rolling resistance behavior. At the same time, the other physical properties remain at virtually the same level. It is therefore possible with the rubber mixture according to the invention, particularly when used in treads, to further improve the rolling resistance of vehicle tires with respect to the prior art without impairing the other tire properties.

TABLE 2

| Constituents | Unit | V2 | E4 | E5 | E6 |
|---|---|---|---|---|---|
| NR TSR | phr | 20 | 20 | 20 | 20 |
| SSBR [a)] | phr | 10 | 29 | 29 | 34 |
| SSBR [b)] | phr | 70 | — | — | — |
| SSBR [c)] | phr | — | 51 | — | — |
| SSBR [d)] | phr | — | — | 51 | — |
| SSBR [e)] | phr | — | — | — | 46 |
| Silica [f)] | phr | 95 | 95 | 95 | 95 |
| Silane [g)] | phr | 6.84 | 6.84 | 6.84 | 6.84 |
| TDAE | phr | 35 | 45 | 45 | 35 |
| Antioxidant | phr | 4 | 4 | 4 | 4 |
| ZnO | phr | 2.5 | 2.5 | 2.5 | 2.5 |
| Stearic acid | phr | 2.5 | 2.5 | 2.5 | 2.5 |
| Accelerator [h)] | phr | 4 | 4 | 3.6 | 3.6 |
| Sulfur | phr | 2 | 2 | 2 | 2 |
| Shore hardness at RT | Shore A | 71 | 64 | 63 | 69 |
| Shore hardness at 70° C. | Shore A | 66 | 60 | 59 | 66 |
| Rebound elasticity at 70° C. | % | 49 | 51 | 53 | 53 |
| Tensile strength | MPa | 17.3 | 15 | 14.2 | 15 |
| Elongation at break | % | 555 | 548 | 503 | 489 |
| Modulus 300 | MPa | 8.4 | 7 | 7.4 | 8.9 |
| $T_g$ of the rubber mixture | °C. | −30 | −31 | −33 | −31 |
| Wear | mm$^3$ | 129 | 102 | 96 | 117 |

Substances used from Table 2:
[a)] SSBR: styrene content = 21 wt %, vinyl content = approx. 61 wt %, $T_g$ = −25° C., functionalized with hydroxy groups, Nipol ® NS 616, firm Nippon Zeon
[b)] SSBR: styrene content = 15 wt %, vinyl content = approx. 25 wt %, $T_g$ = −65° C., functionalized with hydroxy groups, Nipol ® NS 612, firm Nippon Zeon
[c)] SSBR: styrene content = 10.4 wt %; vinyl content = 8.6 wt %; block styrene content = 5%; $T_g$ = −83° C.; $M_w$ = 515,249 g/mol; $M_n$ = 356,031 g/mol; Mooney viscosity = 64.1; modified with IV) (MeO)$_2$(Me)Si—(CH$_2$)$_2$—S—SiMe$_2$C(Me)$_3$
[d)] SSBR: styrene content = 10.5 wt %; vinyl content = 8.8 wt %; block styrene content = 9%; $T_g$ = −83° C.; $M_w$ = 475,274 g/mol; $M_n$ = 343,274 g/mol; Mooney viscosity = 65.5; modified with IV) (MeO)$_2$(Me)Si—(CH$_2$)$_2$—S—SiMe$_2$C(Me)$_3$ and V) (MeO)$_3$Si—(CH$_2$)$_2$—S—SiMe$_2$C(Me)$_3$
[e)] SSBR: styrene content = 0 wt %; vinyl content = 8 wt %; $T_g$ = −94° C.; modified with IV) (MeO)$_2$(Me)Si—(CH$_2$)$_2$—S—SiMe$_2$C(Me)$_3$ and V) (MeO)$_3$Si—(CH$_2$)$_2$—S—SiMe$_2$C(Me)$_3$
[f)] Silica: ULTRASIL ® VN3, firm Evonik
[g)] Silane Si 261 ®, firm Evonik
[h)] Accelerators: DPG (diphenyl guanidine) and CBS As can be seen from Table 2, the rubber mixtures according to the disclosure E4, E5 and E6, at the same glass transition temperature (of the rubber mixture) as their comparison mixture V2, show improved wear and rolling resistance properties (rebound elasticity at 70° C.) It is therefore possible by properly combining the functionalized styrene-butadiene rubber with a styrene content of 0 to 12 wt % and a glass transition temperature of −120 to −75° C. and rubbers with a relatively high glass transition temperature (high-$T_g$ SSBR) in the rubber mixture according to the disclosure to increase the amount of the high-$T_g$ rubber, thus simultaneously improving the wear and rolling resistance properties of the rubber mixture. At the same time, the other physical properties remain virtually at the same level.

It is understood that the foregoing description is that of the preferred embodiments of the invention and that various changes and modifications may be made thereto without departing from the spirit and scope of the invention as defined in the appended claims.

What is claimed is:

1. A sulfur-crosslinkable rubber mixture comprising:
   5 to 95 phr of at least one styrene-butadiene rubber or at least one butadiene rubber,
   wherein the at least one styrene-butadiene rubber or the at least one butadiene rubber is functionalized with at least one functional group selected from the group consisting of phthalocyanine groups, hydroxy groups, epoxy groups, and silane sulfide groups, and
   wherein the at least one styrene-butadiene rubber or the at least one butadiene rubber has a styrene content of 0.1 to 9 wt %, and has a glass transition temperature ($T_g$) in the unvulcanized state according to DSC of −75 to −120° C.;
   5 to 95 phr of at least one further rubber; and,
   20 to 300 phr of at least one silica.

2. The sulfur-crosslinkable rubber mixture as claimed in claim 1, further comprising:
   5 to 20 phr of natural polyisoprene and/or 5 to 20 phr of synthetic polyisoprene.

3. The sulfur-crosslinkable rubber mixture as claimed in claim 1 comprising:
   10 to 70 phr of the at least one styrene-butadiene rubber or the at least one butadiene rubber, and
   10 to 70 phr of a solution-polymerized styrene-butadiene rubber having a glass transition temperature of −40 to +10° C.

4. The sulfur-crosslinkable rubber mixture as claimed in claim 3, wherein the at least one styrene-butadiene rubber or the at least one butadiene rubber is functionalized with silane sulfide groups.

5. The sulfur-crosslinkable rubber mixture as claimed in claim 1, wherein the at least one styrene-butadiene rubber or the at least one butadiene rubber has a glass transition temperature ($T_g$) according to DSC of −80 to −110° C.

6. The sulfur-crosslinkable rubber mixture as claimed in claim 1, wherein the at least one styrene-butadiene rubber or the at least one butadiene rubber is functionalized at their ends with at least one of phthalocyanine groups, hydroxy groups, epoxy groups, and silane sulfide groups.

7. The sulfur-crosslinkable rubber mixture as claimed in claim 1, wherein the at least one styrene-butadiene rubber or the at least one butadiene rubber has a styrene content of 0.1 wt % to 7 wt %.

8. The sulfur-crosslinkable rubber mixture as claimed in claim 1, wherein the at least one styrene-butadiene rubber or the at least one butadiene rubber has a styrene content of 0.1 wt % to 5 wt %.

9. The sulfur-crosslinkable rubber mixture as claimed in claim 1, wherein the at least one styrene-butadiene rubber or the at least one butadiene rubber has a styrene content of 0.1 wt % to 2 wt %.

10. The sulfur-crosslinkable rubber mixture as claimed in claim 1, wherein the at least one further rubber is styrene-butadiene rubber having a glass transition temperature ($T_g$) in the unvulcanized state according to DSC of −40° C. to +10° C., and is present at between 10 and 34 phr.

11. The sulfur-crosslinkable rubber mixture as claimed in claim 10, wherein the at least one further rubber is styrene-butadiene rubber having a glass transition temperature ($T_g$) in the unvulcanized state according to DSC of −25° C. to +10° C., and is present at between 24 and 34 phr.

12. The sulfur-crosslinkable rubber mixture as claimed in claim 1, wherein the at least one styrene-butadiene rubber or the at least one butadiene rubber is functionalized with hydroxyl groups.

13. A vehicle tire comprising the sulfur-crosslinkable rubber mixture as claimed in claim 1 in at least one component.

14. The vehicle tire as claimed in claim 13, wherein the component is a tread and/or a side wall.

15. A method of manufacturing a vehicle tire comprising preparing the rubber mixture as claimed in claim 1.

16. A method of manufacturing a strap, belt, or hose comprising preparing the rubber mixture as claimed in claim 1.

* * * * *